United States Patent
Schrell

(10) Patent No.: US 12,220,877 B2
(45) Date of Patent: Feb. 11, 2025

(54) COMPONENT WITH MONOLITHIC STRUCTURE HAVING BLIND INTERFACE JOINT

(71) Applicant: Rohr, Inc., Chula Vista, CA (US)

(72) Inventor: Johann S. Schrell, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 498 days.

(21) Appl. No.: 17/568,224

(22) Filed: Jan. 4, 2022

(65) Prior Publication Data

US 2023/0211572 A1 Jul. 6, 2023

(51) Int. Cl.
  *B64C 3/18* (2006.01)
  *B29C 65/00* (2006.01)
  *B29L 31/30* (2006.01)

(52) U.S. Cl.
  CPC .......... *B29C 66/742* (2013.01); *B29C 66/721* (2013.01); *B64C 3/185* (2013.01); *B29L 2031/3076* (2013.01); *Y10T 428/24744* (2015.01)

(58) Field of Classification Search
  None
  See application file for complete search history.

(56) References Cited

U.S. PATENT DOCUMENTS

| | | | |
|---|---|---|---|
| 6,718,713 B2 | 4/2004 | McKague, Jr. | |
| 6,849,150 B1 | 2/2005 | Schmidt | |
| 7,244,487 B2 | 7/2007 | Brantley | |
| 7,555,873 B2 | 7/2009 | Kilwin | |
| 8,127,802 B2 | 3/2012 | Ouellette | |
| 9,352,822 B2 | 5/2016 | Nordman | |
| 10,071,794 B2 | 9/2018 | Abe | |
| 10,207,788 B2 | 2/2019 | Ludin | |
| 10,323,667 B2 | 6/2019 | Pyun | |
| 2002/0195524 A1 | 12/2002 | Amaoka | |
| 2003/0146346 A1 | 8/2003 | Chapman, Jr. | |
| 2013/0149164 A1 | 6/2013 | Hansen | |
| 2014/0154458 A1 | 6/2014 | Zilberman | |

FOREIGN PATENT DOCUMENTS

| AU | 2014200142 B2 | 2/2017 |
|---|---|---|
| JP | 2014012467 A | 1/2014 |

OTHER PUBLICATIONS

EP search report for EP23150357.4 dated May 11, 2023.

*Primary Examiner* — Alexander S Thomas
(74) *Attorney, Agent, or Firm* — Getz Balich LLC

(57) ABSTRACT

A component is provided that includes a monolithic structure and a fitting element. The monolithic structure includes first and second outer panels, and spars disposed between the first and second outer panels. The width of the monolithic structure extends between a fitting end and a distal end. The spars extend widthwise between the first and second outer panels. The spar fitting end of each spar has a Y-shaped configuration with first and second finger walls, and a channel disposed there between. Both the first and second finger walls have a divergent end and a distal end. The channel has a closed end and an open end defined at the finger wall distal ends. The fitting element has a body with one or more blades extending outwardly therefrom. Each blade is received in and mates with a spar fitting end channel and is bonded to the spar fitting end.

20 Claims, 4 Drawing Sheets

COMPONENT WITH MONOLITHIC STRUCTURE HAVING BLIND INTERFACE JOINT

BACKGROUND OF THE INVENTION

1. Technical Field

The present disclosure relates to aircraft structures having a plurality of components joined at inaccessible points in general, and to components having blind element interface joints and methods for joining such components in particular.

2. Background Information

Aircraft often include components (e.g., control surfaces, winglets, fins, ailerons, and the like) that include two or more elements joined together. In some instances, one of the component elements is a fitting that is operable to attach the component to a larger body in a fixed or rotatable arrangement and the other component element is a body having a high aspect ratio (e.g., a fin, a control surface, etc.) that makes attachment to the fitting difficult. More specifically, the high aspect ratio and the need to provide a joint with sufficient mechanical strength makes the joint between the components a challenge. Very often, it is not desirable or even possible to use mechanical fasteners (screws, bolts, or the like). In those instances where one of the components is comprised of a first material (e.g., a metallic material) and the second component is comprised of a second material, it can be an even greater challenge to join the components in a satisfactory manner.

What is needed is a solution and/or method for joining such components, including one that provides satisfactory mechanical strength in a lightweight form.

SUMMARY OF THE INVENTION

According to an aspect of the present disclosure, a component is provided that includes a monolithic structure and a fitting element. The monolithic structure includes a first outer panel, a second outer panel, and one or more spars. The spars are disposed between the first outer panel and the second outer panel. Each spar has a body portion and a spar fitting end. The monolithic structure has a width, a length, and a thickness. The width extends between a fitting end and a distal end. The one or more spars extend widthwise between the first outer panel and the second outer panel between the spar fitting end and a spar distal end. The spar fitting end of each of the one or more spars has a Y-shaped configuration with a first finger wall, a second finger wall, and a channel disposed between the first finger wall and the second finger wall. Both the first finger wall and the second finger wall have a divergent end disposed at the body of the spar and a finger wall distal end. The channel has a closed end disposed adjacent the divergent ends of the first and second finger walls, and an open end defined at the finger wall distal ends of the first and second finger walls. The fitting element has a body with a lengthwise extending edge surface and one or more blades that extend outwardly therefrom. The one or more blades are received within and are configured to mate with the respective channel of the one or more spar fitting ends, and the one or more blades are bonded to the one or more spar fitting ends.

In any of the aspects or embodiments described above and herein, the monolithic structure may comprise a composite material.

In any of the aspects or embodiments described above and herein, the fitting element may comprise a metallic material.

In any of the aspects or embodiments described above and herein, the monolithic structure may comprise a thermoset composite material.

In any of the aspects or embodiments described above and herein, the monolithic structure may comprise a fiber-reinforced thermoset composite material.

In any of the aspects or embodiments described above and herein, the first and second finger walls may each have one or more channel side surfaces, and the one or more blades may each have one or more exterior surfaces, and one or more blades received within and mating with the respective channel of the one or more spar fitting ends may be aligned such that a bond can be created between the one or more channel side surfaces and the one or more exterior surfaces.

In any of the aspects or embodiments described above and herein, an adhesive agent may produce the bond between the one or more channel side surfaces and the one or more exterior surfaces.

In any of the aspects or embodiments described above and herein, the channel of the spar fitting end of each of the one or more spars may have a convergent channel portion and a parallel channel portion, wherein the convergent channel portion extends between the parallel channel portion and the closed end of the channel, and the parallel channel portion extends between the open end of the channel and the convergent channel portion.

In any of the aspects or embodiments described above and herein, the channel of the spar fitting end of each of the one or more spars may have a first parallel channel portion having a first channel lateral distance and a second parallel channel portion having a second channel lateral distance, and the first channel lateral distance is greater than the second channel lateral distance. The second parallel channel portion may be disposed adjacent the closed end of the channel and the first parallel channel portion may be disposed adjacent the open end of the channel.

In any of the aspects or embodiments described above and herein, the one or more blades bonded to the one or more spar fitting ends may be disposed internally within the component and inaccessible from a region exterior to the component.

In any of the aspects or embodiments described above and herein, at least one of the first outer panel or the second outer panel of the monolithic structure may include a widthwise extending portion that is attached to the fitting element by mechanical fasteners.

According to another aspect of the present disclosure, a method of producing a component is provided. The method includes: a) providing a monolithic structure that includes a first outer panel, a second outer panel, and one or more spars disposed between the first outer panel and the second outer panel, the one or more spars having a body portion, wherein the monolithic structure has a width, a length, and a thickness, the width extends between a fitting end and a distal end, the one or more spars extend widthwise between the first outer panel and the second outer panel between a spar fitting end and a spar distal end, and wherein the spar fitting end of each of the one or more spars has a Y-shaped configuration with a first finger wall, a second finger wall, and a channel disposed between the first finger wall and the second finger wall, and wherein the both the first and second finger walls have a divergent end disposed at the body of the spar and a finger wall distal end, and the channel has a closed end disposed adjacent the divergent ends of the first and second finger walls, and an open end defined at the finger wall distal ends of the first and second finger walls; b) providing a fitting element having a body with a lengthwise extending edge surface and one or more blades that extend outwardly from the lengthwise extending edge surface, wherein the one or more blades are configured to mate with the respective channel of the one or more spar fitting ends; c) coupling the monolithic structure with the fitting element such that each of the one or more blades is received within a respective said channel of the one or more spar fitting ends; and d) bonding the one or more blades with the respective said channel of the one or more spar fitting ends.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

The present disclosure is directed to components that include a plurality of elements joined together and a method for producing the same. Such components may be used in a variety of different applications, including aircraft applications where mechanical strength and light weight are important. Hence, for ease of description the present disclosure will be described in terms of aircraft components but is not limited thereto.

Figure 1:
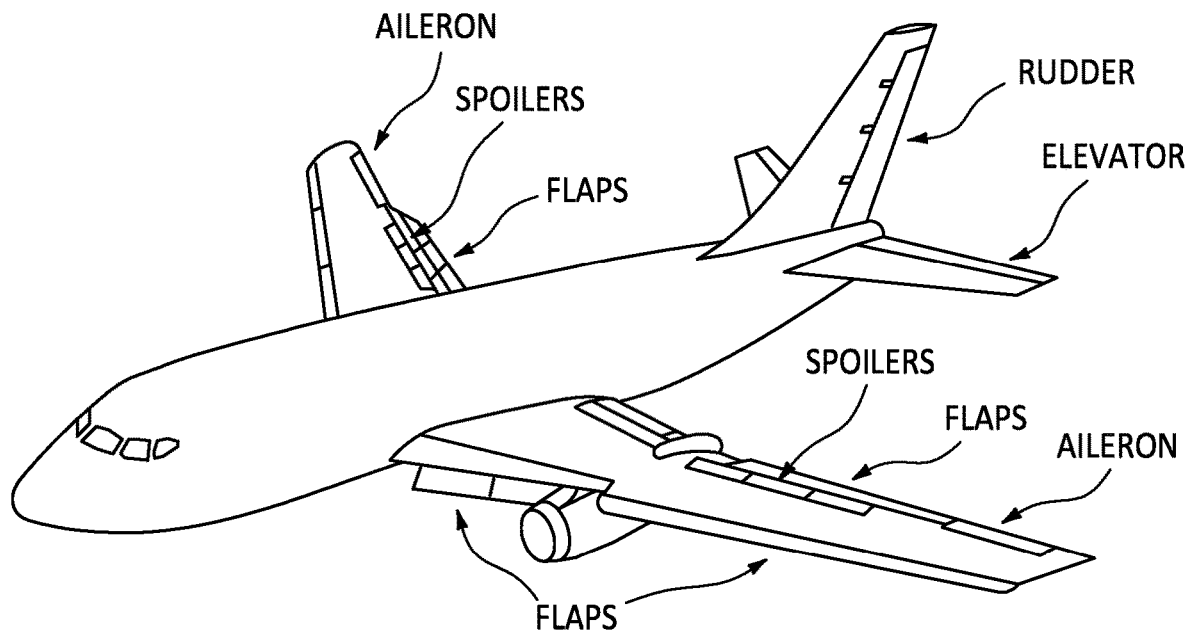
FIG. 1 is a perspective view of an exemplary aircraft.
Figure 2:
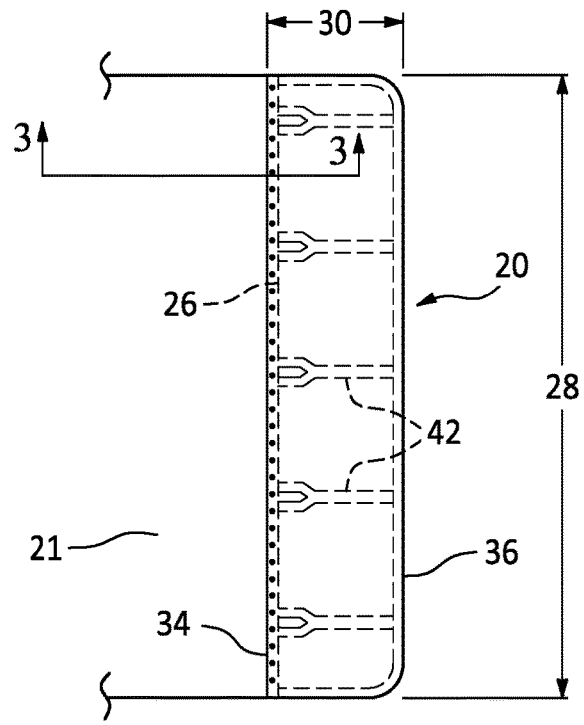
FIG. 2 is a diagrammatic illustration of a component embodiment according to the present disclosure.
Figure 3:
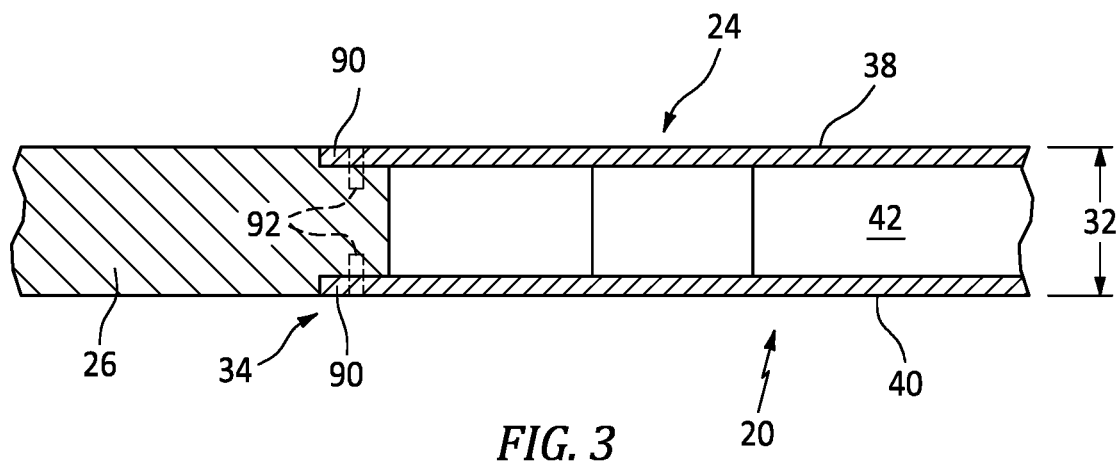
FIG. 3 is a partial sectional view of the component embodiment diagrammatically shown in FIG. 2.

Referring to the FIGURES, an example of a component according to the present disclosure is a relatively thin aircraft component, which may also be referred to as a high-aspect ratio component. Non-limiting types of such aircraft components include control surfaces, winglets, wings, fins, ailerons, canards, elevators, and the like. FIG. 1 illustrates an aircraft with components of the type that may be produced according to the present disclosure. FIGS. 2 and 3 are diagrammatic illustrations of a component 20 attached to a body 21. The component 20 includes a monolithic structure 24 and a fitting element 26. The monolithic structure 24 may be described as having a length 28, a width 30, and a thickness 32. The component width 30 extends between a fitting end 34 and a distal end 36 opposite the fitting end 34. The monolithic structure 24 includes a first outer panel 38, a second outer panel 40, and a plurality of spars 42 disposed between the first and second outer panels 38, 40. In some instances, the monolithic structure 24 may also include structural elements disposed between the panels 38, 40 in addition to the spars 42; e.g., ribs (not shown) that extend between spars, etc. The first and second outer panels 38, 40 extend both widthwise and lengthwise. The spars 42 may be disposed to extend widthwise between the outer panels 38, 40; e.g., between the distal end 36 and the fitting end 34 of the monolithic structure 24. In those structures that include ribs, the ribs may be disposed orthogonally relative to the spars 42; i.e., in a lengthwise direction.

Figure 4:
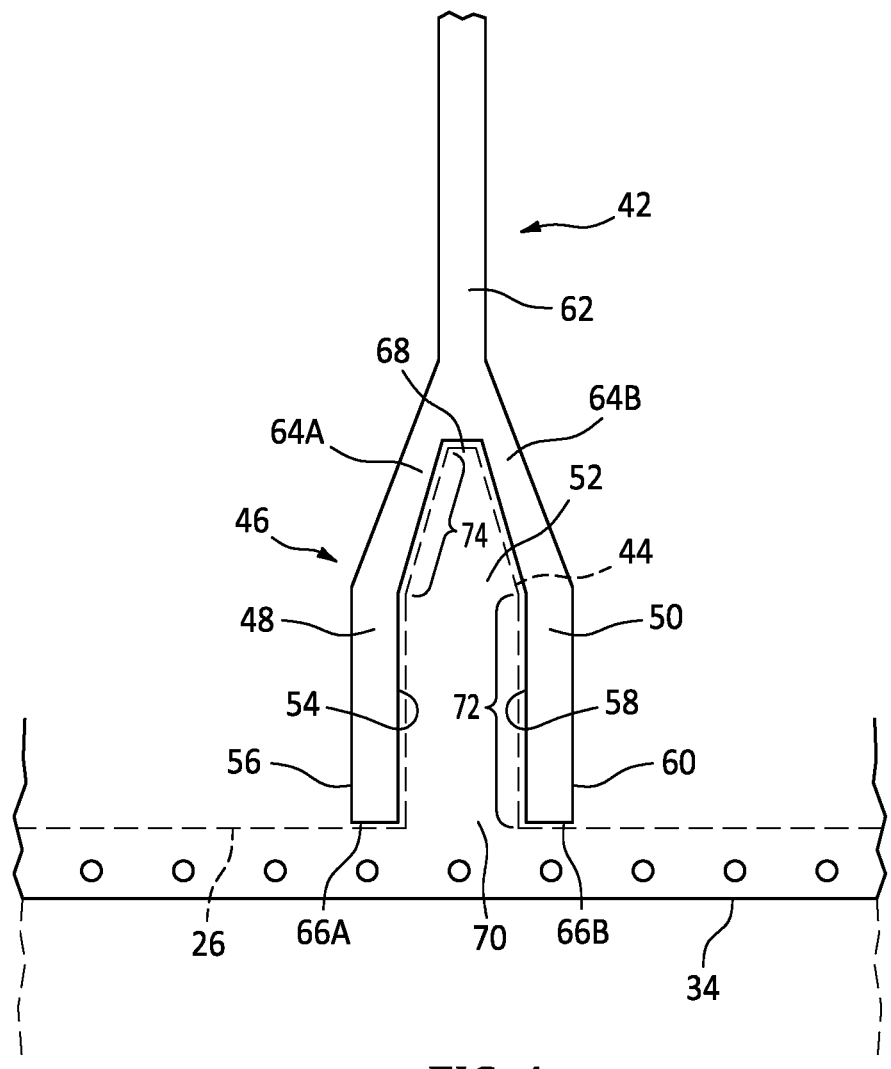
FIG. 4 is a diagrammatic top planar partial view of a spar and fitting element embodiment with an outer panel removed.
Figure 5:
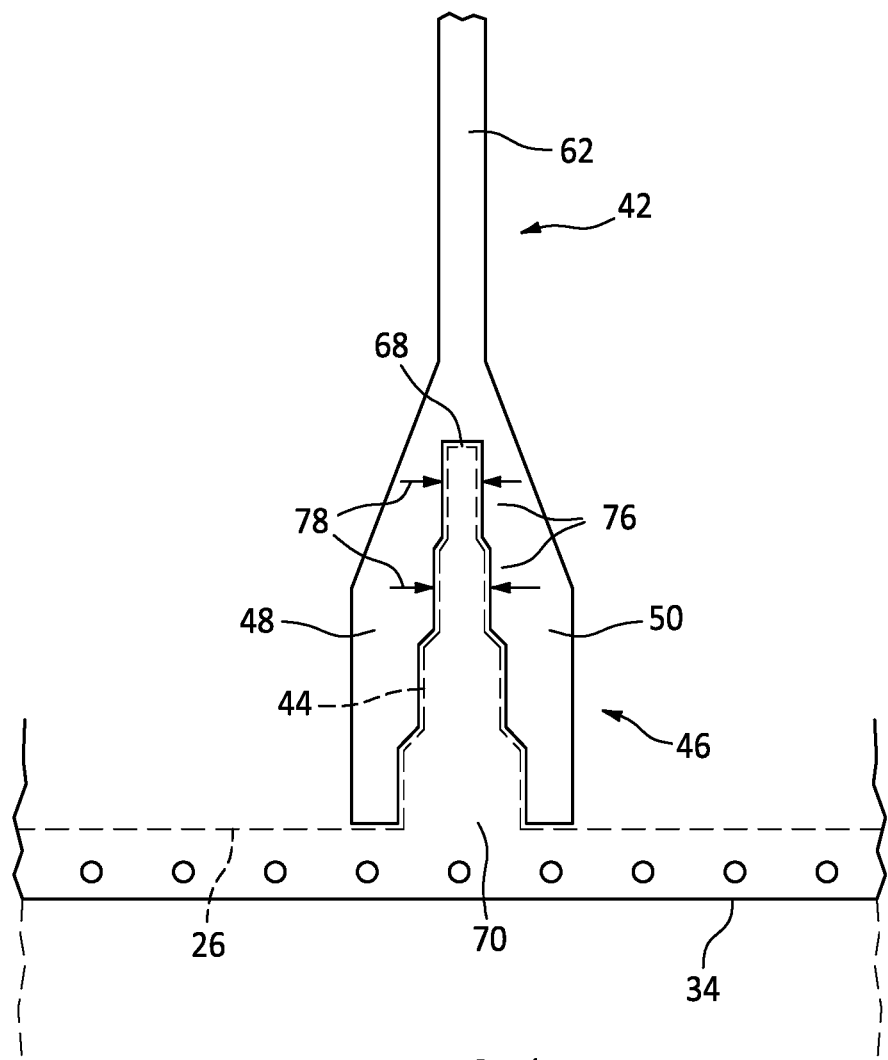
FIG. 5 is a diagrammatic top planar partial view of a spar and fitting element embodiment with an outer panel removed.
Figure 6:
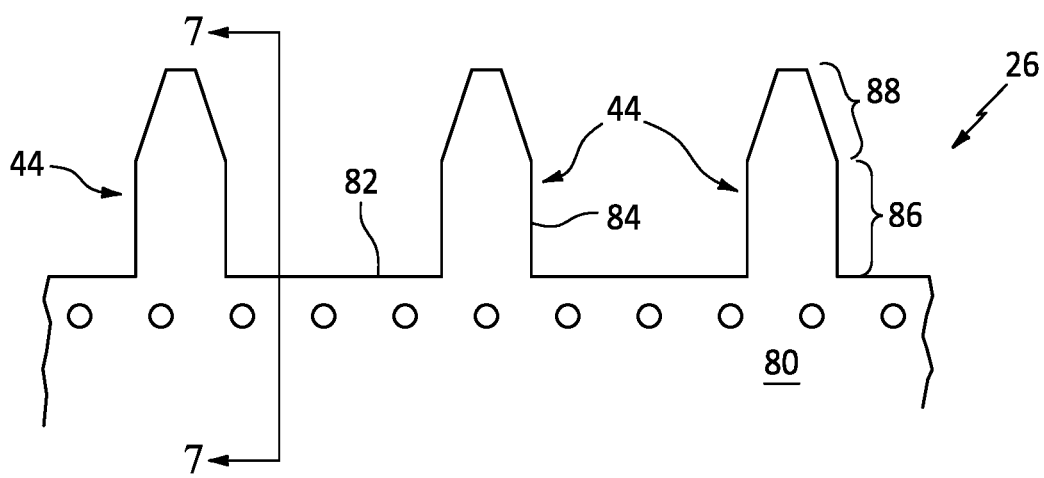
FIG. 6 is a diagrammatic top planar partial view of a fitting element embodiment.

The widthwise end of each spar 42 disposed at the fitting end 34 is configured to mate with a respective blade 44 of the fitting element 26 (fitting element 26 shown in dashed line in FIGS. 4 and 5); e.g., the fitting end of the spar ("spar fitting end 46") is configured as a female portion and the respective blade 44 is configured as a male portion. The mating spar fitting end 46 and the fitting element blade 44 may be referred to as a "joint". Each spar fitting end 46 may be generally described as having a Y-shaped configuration with a first finger wall 48 and a second finger wall 50 that collectively define a channel 52 disposed there between. The first finger wall 48 has a channel side surface 54 and an exterior surface 56. The second finger wall 50 has a channel side surface 58 and an exterior surface 60. The first and second finger walls 48, 50 diverge from the widthwise extending body 62 of the spar 42 and separate from one another to define the channel 52 disposed there between. Each finger wall 48,50 may be described as having a divergent end 64A, 64B (disposed where the respective finger wall 48,50 diverges from the spar body 62) and an opposite distal end 66A, 66B (disposed at the fitting element 26 as will be described). The channel 52 may be described as having a closed end 68 (adjacent the divergence of the finger walls 48,50) and an open end 70. The open end 70 of the channel 52 is defined at the distal ends 66A,66B of the finger walls 48,50. In some embodiments, the first and second finger walls 48,50 may be mirror images of each other; e.g., left and right hand versions. In such embodiments, the first and second finger walls 48, 50 may be opposite in hand but otherwise substantially identical in configuration.

The channel 52 may assume a variety of different configurations. The geometry of the channel 52 is typically chosen to have an amount of surface area (i.e., the combined channel side surface area of the first and second finger walls 48,50) that is adequate to provide sufficient bonding for the application as will be described below. In the configuration shown in FIG. 4, the spar fitting end 46 has a channel 52 that includes a parallel channel portion 72 and a convergent channel portion 74. The parallel channel portion 72 extends between the open end 70 of the channel 52 and the convergent channel portion 74. The convergent channel portion 74 extends between the parallel channel portion 72 and the closed end 68 of the channel 52. In the configuration shown in FIG. 5, the spar fitting end 46 has a channel 52 with a stepped configuration. The stepped configuration includes a plurality of parallel channel portions 76 each with a different channel lateral distance 78. The parallel channel portion 76 having the largest channel lateral distance 78 is contiguous with the open end 70 of the channel 52 and the parallel channel portion 76 having the smallest channel lateral distance 78 is contiguous with the closed end 68 of the channel 52. The channel 52 configurations shown in FIGS.

4 and 5 are examples provided to illustrate the scope of channel 52 configurations and therefore the scope of spar fitting end 46 configurations. The present disclosure is not limited to these examples. A variety of channel 52 configurations that permit insertion of a mating fitting element blade 44 may be used. In some embodiments all of the spar fitting ends 46 have the same configuration. In other embodiments, the configuration of the spar fitting ends 46 may vary. In this latter configuration, different spar fitting end 46 configurations may be used to ensure the desired orientation of the monolithic structure 24 and the fitting element 26.

As stated above, the component 20 (and therefore the monolithic structure 24) may be configured for a variety of different applications; e.g., control surfaces, winglets, wings, fins, ailerons, canards, and the like. In many of these applications, the monolithic structure 24 may comprise a fiber reinforced composite material; e.g., a thermoset fiber reinforced composite material. A specific example of such a composite material is one having a bismaleimide (BMI) matrix reinforced with fibers; e.g., carbon fibers, Kevlar fibers, and the like. The present disclosure is not limited to using any particular composite material. In those embodiments where a monolithic structure 24 comprises a composite material, the monolithic structure 24 may be manufactured using a variety of different processes. For example, in some embodiments a monolithic structure 24 may be initially formed with the first and second outer panels 38,40 and spar bodies 62 disposed there between less the spar fitting ends 46. In these instances, the monolithic structures 24 may be formed using a variety of different manufacturing techniques such as, but not limited to, closed mold processes such as resin pressure molding (RPM) or resin transfer molding (RTM), and the like. Subsequently, pre-formed spar fitting ends 46 may be integrated with the spar bodies 62 disposed within the initial monolithic structure to complete the monolithic structure 24. Alternatively, spar fitting ends 46 may be formed from composite material plies formed in the desired spar fitting end 46 configuration and integrated with the respective spar bodies 62 disposed within the initial monolithic structures to complete the monolithic structure 24.

Figure 7:
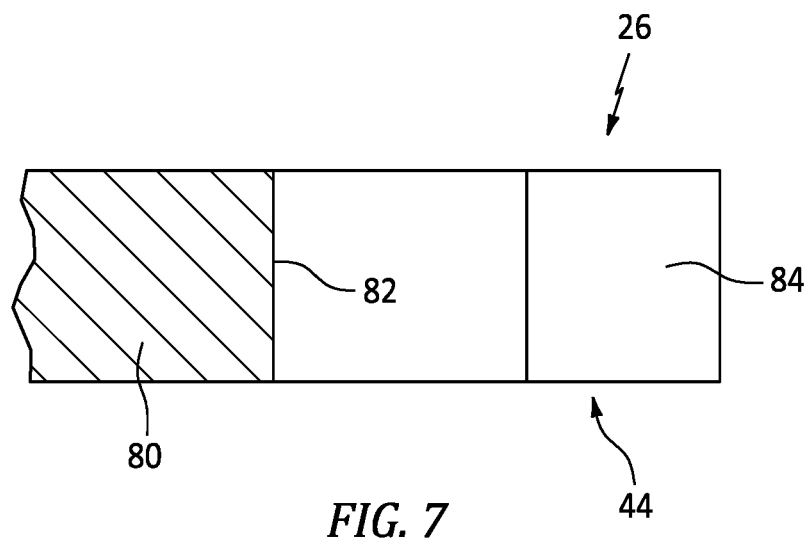
FIG. 7 is partial sectional view of the fitting element embodiment diagrammatically shown in FIG. 6

The fitting element 26 portion of the component 20 is configured to be joined with the monolithic structure 24 along the length of the monolithic structure 24 at the widthwise fitting end of the monolithic structure 24. The fitting element 26 may be configured to attach the component 20 to an aircraft structure in a fixed manner or in a pivotable manner. The fitting element 26 may be described as having a body 80 that includes an edge surface 82 that extends lengthwise. A plurality of features (each referred to herein as a "blade 44"—e.g., see FIG. 7) extend outwardly from the edge surface 82. Each of the blades 44 is configured to form the male portion of the mating connection formed between the fitting element 26 and the monolithic structure 24. The term "blade" as used herein should not be construed as implying any geometric configuration, other than a geometric configuration that mates with a respective spar fitting end channel 52. Each fitting element blade 44 has an exterior surface 84 having a surface area. To illustrate and referring to the embodiment shown in FIGS. 4 and 7, a fitting element blade 44 may have a parallel portion 86 and a convergent portion 88. In the diagrammatic view shown in FIG. 4, one of the outer panels 38, 40 of the monolithic structure 24 is removed to provide a view of the spar 42 and the fitting element blade 44 (shown in dashed lines). As can be seen, the fitting element blade 44 and the spar fitting end 46 channel have mating geometries that closely align; e.g., leaving sufficient room between the channel side surfaces 54 of channel 52 and the exterior surfaces 84 of the blade 44 for a bond to be created therebetween by an adhesive material or otherwise as will be described below. Now referring to FIG. 5, another exemplary fitting element blade 44 (shown in dashed lines) is shown having a plurality of parallel portions. As stated above, these fitting element blade 44 configurations are examples, and the present disclosure is not limited thereto. Components 20 according to the present disclosure have at least one fitting element blade 44 and therefore at least one mating spar/blade joint. The exact number of mating spar/blade joints may vary depending on the application.

The fitting element 26 may comprise a variety of different materials. For example, in some applications, a fitting element 26 that comprises a metallic material (e.g., aluminum, titanium, steel, or alloys thereof, etc.) is desirable. The present disclosure components 20 are not, however, limited to using metallic fitting elements 26, and may alternatively use polymeric fitting elements 26, or composite fitting elements 26, or the like, or any combination thereof.

In some component 20 embodiments, one or both of the outer panels 38,40 of the monolithic structure 24 may include widthwise extending portions 90 that extend widthwise beyond the spars 42 for attachment to the fitting element 26. FIG. 3, for example, shows both the first and second outer panels 38,40 having widthwise extension portions 90 that extend beyond the mating spar/blade joints. Mechanical fasteners 92 may be used to connect these widthwise extension portions 90 to the fitting element 26.

In some embodiments, the spar fitting end 46 and fitting element blade 44 are attached to one another by an adhesive agent that creates a bond between at least some, and preferably most, of the channel side surfaces 54,58 of the channel 52 and the exterior surfaces 84 of the blade 44. An adhesive material that produces an acceptable bond characteristics (e.g., strength, useful life, etc.) for component 20 operating conditions (e.g., forces applied, temperature, environmental conditions, etc.) and spar/fitting element materials (e.g., composite/metallic, or composite/composite, etc.) is used. The present disclosure is not limited to any particular adhesive material.

Each mating spar/blade joint is configured to withstand at least a portion of the loading (e.g., bending loads, shear loads, etc.) associated with the component 20 application. For example, the contiguous surface areas of the channel side surfaces 54, 58 of the channel and the exterior surfaces 84 of the blade 44 are typically sized to produce a bond interface that can withstand a portion of the loading associated with the component 20 application. Larger loading applications can be accommodated by increasing the joined surfaces areas and/or the mating configuration, and/or increasing the number of spars 42. In those embodiments wherein the attachment between the fitting element 26 and the monolithic structure 24 is limited to the mating spar/blade joints, the aforesaid mating spar/blade joints collectively withstand the loading associated with the component 20 application. In those embodiments wherein the attachment between the fitting element 26 and the monolithic structure 24 includes the mating spar/blade joints and mechanical fasteners 92 attaching widthwise extending portions 90 of the outer panels 38,40 to the fitting element 26, the loading associated with the component 20 application may be accommodated by both the mechanical fastener attachment and the bonded mating spar/blade joints.

An example of a present disclosure method for forming a component 20 as described above includes forming an initial monolithic structure 24 with the first and second outer panels 38,40 and spar bodies 62 disposed there between less the fitting ends 46. In that case, preformed spar fitting ends 46 may be subsequently integrated with the spar bodies 62 disposed within the initial monolithic structure 24, or the integration process may include forming spar fitting ends 46 in the desired spar fitting end 46 configuration using composite material plies. As stated above, a monolithic structure 24 may be formed from a fiber reinforced composite material such as a carbon fiber reinforced BMI composite. The forming process may include using a closed mold process such as a resin pressure molding (RPM) process. A complete monolithic structure 24 (i.e., including the spar fitting ends 46) produced in this manner provides a lightweight, strong, durable, and inexpensive alternative to a similar structure formed from a metallic material.

The present method may further include producing a fitting element 26 having a body 80 with a lengthwise extending edge surface 82 that includes one or more blades 44 extending outwardly from the edge surface 82. Each of the aforesaid blades 44 is configured to have a geometry that mates with the channel 52 of a respective spar fitting end 46; i.e., to form the male portion of the mating connection formed between the fitting element 26 and the monolithic structure 24. As stated above, the fitting element 26 may be formed from a metallic material such as aluminum, titanium, steel, or the like, or alternatively a composite material.

An adhesive agent operable to create a bond between one or more channel side surfaces 54, 58 of the channel 52 and one or more blade 44 exterior surfaces 84 may be applied to at least one or more channel side surface 54, 58 and/or at least one blade 44 exterior surface 84. In some embodiments, the adhesive agent is applied all of the channel side surfaces 54, 58 of the respective fitting end channel 52 and/or all of the exterior surfaces 84 of the respective blade 44. Once the monolithic structure and the fitting element 26 are in form for joinder, the two elements 24,26 are brought together with each blade 44 received within an aligned spar fitting end channel 52. At this point, the "joint" between the respective blade 44 and the spar fitting end channel 52 are internal to the component 20 and are inaccessible from the exterior of the component 20; i.e., the joints are "blind". The steps necessary to produce the desired bonding between the now coupled elements 24,26 may vary depending on the particular adhesive agent used. For example, some adhesive agents are configured to cure under predetermined environmental conditions; e.g., pressure, elevated temperature, etc. The present disclosure is not limited to any particular bonding process.

In embodiments wherein the monolithic structure 24 and the fitting element 26 are both comprised of polymeric material(s), the bonding there between may be produced by resin transfer and/or resin bonding between the two elements 24,26 at the various interfaces. In these instances, the need for an adhesive agent may be obviated.

In those embodiments wherein one or both of the outer panels of the monolithic structure 24 include widthwise extending portions 90 that extend widthwise beyond the spars 42, the aforesaid widthwise extension portions 90 may be attached to the fitting element 26 via mechanical fasteners 92 or by other means.

As is described above, the present disclosure provides a novel and unobvious lightweight, strong, durable, and inexpensive component 20 that does not require mechanical fasteners. High aspect ratio components 20 very often have a thickness that makes it difficult or impossible to use mechanical fasteners to combine component elements. In fact, these type components often have elements that are internally located and therefore inaccessible for such attachment procedures. Still further, attachment schemes that pass through the outer panels are often undesirable. The present disclosure provides a solution that avoids the need for mechanical fasteners internally within the component 20 or attachment schemes that require fasteners extending through component 20 outer panels and provides an attachment that can be configured to provide the requisite attachment integrity in a cost effective way. This is particularly true for components that include a metallic fitting element 26 and a composite monolithic structure 24.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and subcombinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A component, comprising:
a monolithic structure that includes:
 a first outer panel;
 a second outer panel; and
 one or more spars disposed between the first outer panel and the second outer panel, the one or more spars having a body portion;
wherein the monolithic structure has a width, a length, and a thickness, the width extends between a fitting end and a distal end, the one or more spars extend widthwise between the first outer panel and the second outer panel between a spar fitting end and a spar distal end;
wherein the spar fitting end of each of the one or more spars has a Y-shaped configuration with a first finger wall, a second finger wall, and a channel disposed between the first finger wall and the second finger wall;
wherein both the first finger wall and the second finger wall have a divergent end disposed at the body of the spar and a finger wall distal end, and the channel has a closed end disposed adjacent the divergent ends of the first finger wall and the second finger wall, and an open end defined at the finger wall distal ends of the first finger wall and the second finger wall;
a fitting element having a body with a lengthwise extending edge surface and one or more blades that extend outwardly from the lengthwise extending edge surface;
wherein the one or more blades are received within and are configured to mate with the respective channel of the one or more spar fitting ends, and the one or more blades are bonded to the one or more spar fitting ends.

2. The component of claim 1, wherein the monolithic structure comprises a composite material.

3. The component of claim 2, wherein the fitting element comprises a metallic material.

4. The component of claim 3, wherein the monolithic structure comprises a thermoset composite material.

5. The component of claim 4, wherein the monolithic structure comprises a fiber-reinforced thermoset composite material.

6. The component of claim 1, wherein the first finger wall and the second finger wall each have one or more channel side surfaces, and the one or more blades each have one or more exterior surfaces; and
wherein the one or more blades received within and mating with the respective channel of the one or more spar fitting ends are aligned such that a bond can be created between the one or more channel side surfaces and the one or more exterior surfaces.

7. The component of claim 6, wherein an adhesive agent produces the bond between the one or more channel side surfaces and the one or more exterior surfaces.

8. The component of claim 1, wherein an adhesive agent bonds the one or more blades to the one or more spar fitting ends.

9. The component of claim 1, wherein the channel of the spar fitting end of each of the one or more spars has a convergent channel portion and a parallel channel portion;
wherein the convergent channel portion extends between the parallel channel portion and the closed end of the channel and the parallel channel portion extends between the open end of the channel and the convergent channel portion.

10. The component of claim 1, wherein the channel of the spar fitting end of each of the one or more spars has a first parallel channel portion having a first channel lateral distance and a second parallel channel portion having a second channel lateral distance, and the first channel lateral distance is greater than the second channel lateral distance.

11. The component of claim 10, wherein the second parallel channel portion is disposed adjacent the closed end of the channel and the first parallel channel portion is disposed adjacent the open end of the channel.

12. The component of claim 1, wherein the one or more blades bonded to the one or more spar fitting ends are disposed internally within the component and inaccessible from a region exterior to the component.

13. The component of claim 1, wherein at least one of the first outer panel or the second outer panel of the monolithic structure includes a widthwise extending portion that is attached to the fitting element by mechanical fasteners.

14. A method of producing a component, comprising:
providing a monolithic structure that includes a first outer panel, a second outer panel, and one or more spars disposed between the first outer panel and the second outer panel, the one or more spars having a body portion;
wherein the monolithic structure has a width, a length, and a thickness, the width extends between a fitting end and a distal end, the one or more spars extend widthwise between the first outer panel and the second outer panel between a spar fitting end and a spar distal end;
wherein the spar fitting end of each of the one or more spars has a Y-shaped configuration with a first finger wall, a second finger wall, and a channel disposed between the first finger wall and the second finger wall;
wherein the both the first finger wall and the second finger wall have a divergent end disposed at the body of the spar and a finger wall distal end, and the channel has a closed end disposed adjacent the divergent ends of the first finger wall and the second finger wall, and an open end defined at the finger wall distal ends of the first finger wall and the second finger wall;
providing a fitting element having a body with a lengthwise extending edge surface and one or more blades that extend outwardly from the lengthwise extending edge surface, wherein the one or more blades are configured to mate with the respective channel of the one or more spar fitting ends;
coupling the monolithic structure with the fitting element such that each of the one or more blades is received within a respective said channel of the one or more spar fitting ends; and bonding the one or more blades with the respective said channel of the one or more spar fitting ends.

15. The method of claim 14, wherein the monolithic structure comprises a composite material and the fitting element comprises a metallic material.

16. The method of claim 15, wherein the first finger wall and the second finger wall each have one or more channel side surfaces, and the one or more blades each have one or more exterior surfaces; and wherein the one or more blades received within and mating with the respective channel of the one or more spar fitting ends are aligned such that a bond can be created between the one or more channel side surfaces and the one or more exterior surfaces.

17. The method of claim 16, wherein an adhesive agent produces the bond between the one or more channel side surfaces and the one or more exterior surfaces.

18. The method of claim 14, wherein the one or more blades bonded to the one or more spar fitting ends are disposed internally within the component and inaccessible from a region exterior to the component.

19. The method of claim 14, wherein the monolithic structure comprises a fiber-reinforced thermoset composite material.

20. The method of claim 14, wherein at least one of the first outer panel or the second outer panel of the monolithic structure further includes a widthwise extending portion; and the method further includes attaching the widthwise extending portion of the at least one of the first outer panel or the second outer panel to the fitting element by mechanical fasteners.

\* \* \* \* \*